March 17, 1931.　　　O. V. JONES ET AL　　　1,796,951

APPARATUS FOR PURIFYING CREAM

Filed Dec. 5, 1928

Inventors
O. V. Jones
A. Schneider
By E. E. Huffman
Att'y.

Patented Mar. 17, 1931

1,796,951

UNITED STATES PATENT OFFICE

OLIVER V. JONES, OF WEBSTER GROVES, AND ALVIN SCHNEIDER, OF ST. LOUIS, MISSOURI

APPARATUS FOR PURIFYING CREAM

Application filed December 5, 1928. Serial No. 323,885.

Our invention relates to apparatus for purifying cream and is applicable particularly to a system of pasteurization in which the cream is constantly passed through one or more pasteurizers so that the operation of purifying and pasteurizing may be carried on simultaneously in a continuous operation.

Figure 1:
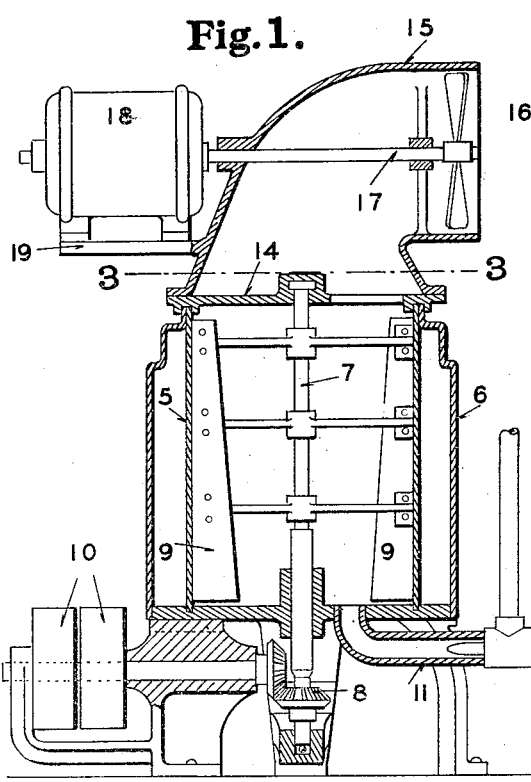
Figure 2:
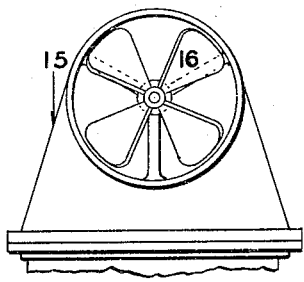
Figure 3:
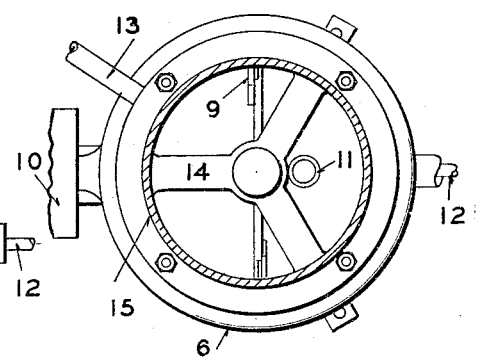
Figure 4:
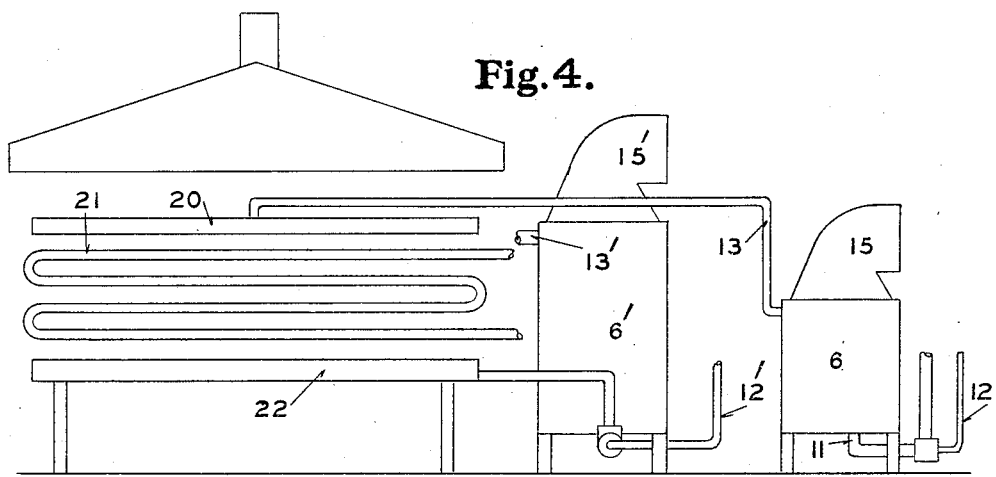

In the accompanying drawings, which illustrate one form of apparatus made in accordance with our invention, Figure 1 is a vertical section through one of the pasteurizers; Figure 2 is a front elevation of the upper part of one of the pasteurizers; Figure 3 is a section taken on the line 3—3 of Figure 1; and Figure 4 is a diagrammatic view of a system including two pasteurizers.

In carrying out our invention we employ pasteurizers which in general construction are similar to those now in use consisting of a cylindrical cream chamber 5 surrounded by a steam jacket 6. Centrally located in the chamber 5 is an impeller shaft 7 driven by bevel gearing 8 and carrying impeller blades 9 running closely adjacent to or in contact with the walls of the chamber 5. Tight and loose pulleys 10 control the operation of the impeller shaft.

Cream is admitted to the bottom of the chamber 5 through a pipe 11 into which projects an air nozzle 12 by means of which air is admitted to the chamber together with the cream, which air is thoroughly mixed with the cream in its travel to the top of the chamber by the action of the impeller blades. The cream, after passing through the chamber, is discharged through a pipe 13. The cover of the pasteurizer instead of being solid, as in the usual construction, is cut away to form a spider, as best shown in Figure 3, and has secured upon it a hood 15 substantially L-shaped in form. Mounted in the horizontal branch of the hood adjacent to its discharge orifice is an exhaust fan 16. This fan is mounted on a shaft 17 extending through the hood and driven by a motor 18 situated outside of the hood and carried on a bracket 19 thereon. By this construction not only is the hood left free and unobstructed so that the deleterious gases may be blown away immediately upon reaching the surface of the cream, but the motor is also protected from the action of water vapor arising from the cream.

While passage through one of our pasteurizers will often be sufficient to effectively purify the cream it may be desirable to employ more than one. In Figure 4 we have shown a system employing two of our pasteurizers which we have found effective in purifying cream of the most objectionable character encountered in creamery practice. In this system the cream, after passing through the first pasteurizer where it is treated at a temperature of about 145 degrees, passes through pipe 13 to a spreader pan 20 by which it is sprayed over escape coils 21 maintained at about the same temperature by hot water flowing through them. The cream is received from the escape coils by a drip pan 22 and passed to a second pasteurizer similar to the first but maintained at a temperature of about 180 degrees. From this second pasteurizer the cream is delivered in completely purified condition through the discharge pipe 13' either to the churning apparatus or to any suitable container.

We wish to be understood that we do not desire to claim as novel the passage of air through the cream in a pasteurizer but only in connection with means for removing the noxious gases from the surface of the cream.

Having fully described our invention, what we claim as new and desire to secure by Letters Patent of the United States is:

1. In a device of the class described, the combination with a pasteurizing chamber, of means for feeding air through said chamber together with cream impeller blades in said chamber, and means for positively removing the resulting gases directly from the surface of the cream in the chamber.

2. In a device of the class described, the combination with a pair of pasteurizing chambers, of means for feeding air through each of said chambers together with cream, means for positively removing the resulting gases from the surface of the cream in each chamber, and an escape coil interposed between said chambers.

In testimony whereof, we hereunto affix our signatures, this 1st day of December, 1928.

OLIVER V. JONES.
ALVIN SCHNEIDER.